3,525,621
ANTISTATIC PHOTOGRAPHIC ELEMENTS
Donald N. Miller, Penfield, N.Y., assignor to Eastman
 Kodak Company, Rochester, N.Y., a corporation of
 New Jersey
Continuation-in-part of application Ser. No. 594,226,
 Nov. 14, 1966. This application Feb. 12, 1968, Ser.
 No. 704,714
Int. Cl. G03c 1/82, 1/86
U.S. Cl. 96—85                    21 Claims

ABSTRACT OF THE DISCLOSURE

Antistatic properties are imparted to photographic elements without detrimental effect on the photographic properties thereof by incorporating therein an antistatic layer containing both colloidal silica and an ionic organic antistatic agent such as, for example, a salt containing arylsulfonic acid groups or a salt of a polymeric carboxylic acid.

---

Figure 1:
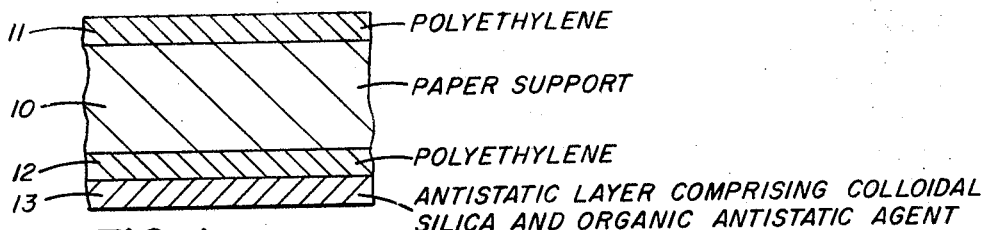

This is a continuation-in-part of application Ser. No. 594,226, filed Nov. 14, 1966, and now abandoned.

This invention relates to improved photographic elements incorporating a novel antistatic layer. More particularly, this invention relates to a novel antistatic coating composition comprising colloidal silica and an ionic organic antistatic agent and to photographic elements such as photographic paper and film comprising an antistatic layer produced therefrom. In one particular aspect the invention relates to waterproof photographic elements comprising a paper support coated with a polymer layer and having the antistatic layer on the surface of the polymer layer. In a further particular aspect the invention relates to photographic elements in which the antistatic layer is coated directly on a paper support. In a still further particular aspect the invention relates to photographic elements comprising an antistatic layer coated on photographic film base.

It is known that paper for photographic use may be rendered substantially waterproof by application thereto of various hydrophobic polymeric materials such as styrene polymers, polyacrylates, polyethylene, etc. Although such photographic papers show markedly improved water resistance, they have not proven entirely satisfactory because of their tendency to accumulate static electrical charges during manufacture, handling and use. The static discharges cause irregular fog patterns in the photographic emulsion coated thereon. The static charges are also undesirable because dirt, which the charges attract to the web, causes repellancy spots, desensitization, fog and physical defects. On polymer coated papers such as polyethylene coated papers this static problem is serious because of the non-conductive nature of the polymer coating. However, the polyolefins in particular are known to have many outstanding properties as coating materials, and it would therefore, be highly desirable to provide the art with polyolefin and similar polymer coated photographic papers having an effective antistatic coating thereon.

In certain uses for photographic papers it is not necessary that the paper be rendered waterproof by coating with a hydrophobic polymeric material but it may nonetheless be necessary to reduce the tendency for accumulation of static electrical charge, even though this problem is ordinarily less acute with such paper than with resin-coated paper. There is thus also a need in the art for an effective method of imparting antistatic properties to non-resin-coated photographic papers.

The generation of static charges in photographic papers such as mentioned above occurs on sensitizing machines or high speed slitting and spooling equipment in two types, namely, unwind static and transport static. A corona forms at the unwind stand where the unwinding paper separates from the roll; this is called unwind static, and is affected by speed, the composition of the emulsion coating and the wire side coating. Static discharges also occur throughout the machine as a result of contact and separation of the coatings with transport rollers; transport static is affected by speed, the composition of the rollers and wire side surface. The internal conductivity and moisture content of the sheet and the atmospheric conditions of the room also affect static generation.

In other words, the generation of the static charge is a dynamic phenomenon which is affected by the rate of contact electrification of the sheet by friction and the conductivity of the sheet (surface and internal) which controls the rate of dissipation of the charge. The two factors, electrification and dissipation, must be correctly balanced or a corona forms at the unwind and spark discharges occur as transport static. To avoid static the dissipation rate must be greater than the electrification rate. This value is determined herein by measuring surface conductivity in terms of surface resistivity at specific conditions of temperature and humidity, namely, at 75° F. and 20% relative humidity, between two electrode plates and calculating the surface resistivity according to the formula:

Resistivity (ohms) = Resistance observed (ohms) × $\frac{\text{Spacing between electrodes (cms.)}}{\text{Length of electrodes (cm.)}}$ For further details of the above method for measuring surface resistivities, reference may be had to G. F. Nadeau et al., U.S. Pat. No. 2,801,191, issued July 30, 1957. It has been found in the present invention that if the resistivity measurement for resin-coated paper indicates a value of about $1.0 \times 10^{12}$ ohms (as compared to a value of greater than about $1.0 \times 10^{15}$ ohms on similar papers but without the benefit of the antistatic layer of this invention, then satisfactory static protection is indicated. For non-resin coated papers the surface resistivity will ordinarily be somewhat lower than for resin-coated papers, but it will be decreased to an even lower level by use of the antistatic layer of this invention.

I have now made the important discovery that greatly improved photographic elements, such as photographic films and papers, which combine outstanding antistatic properties with excellent photographic characteristics can be prepared by incorporating in the element a novel antistatic layer of the composition hereinafter described. These may, for example, be waterproof elements in which polymer layers are applied to both sides of the paper support with the antistatic layer over the polymer layer on one side and on the other side a photographic layer such as a silver precipitating layer, a lithographic printing layer, or one or more light-sensitive silver halide emulsion layers. Alternatively, they may be non-waterproof elements such as a paper support coated on one side with the antistatic layer and on the opposite side with a coating of baryta over which are applied one or more light-sensitive silver halide emulsion layers. In preparing such elements any of the conventional raw stocks for manufacture of photographic paper may be utilized. In a further embodiment of the invention, the antistatic layer may be applied to one side of conventional photographic film base having on the opposite side a subbing layer covered by one or more light-sensitive silver halide emulsion layers. More than one antistatic layer may be employed in a single photographic element and they may be employed as inner layers, for example beneath a coating of polymer, or as outer layers, for example over the surface of a polymer layer. A particularly important embodiment of the invention provides the antistatic layer as an outer layer on top of a polymer layer which is on the side opposite to the light-sensitive photographic layer. This type of element will have an electrical resistivity of less than $10^{12}$ ohms and commonly in the range from about $10^6$ to $10^9$ ohms, depending to some extent on the thickness of the antistatic layer.

Antistatic layers in accordance with this invention comprise colloidal silica in admixture with ionic organic agents that are surface-active agents which act to improve the electrical conductivity of the layer. This combination of materials provides a coating with high conductivity as well as the other essential properties which enable production of photographic elements that are free from static charge defects arising in their manufacture, handling, and use.

An unexpected feature of the use of the antistatic layer of colloidal silica and ionic organic agent resides in the fact that while colloidal silica alone imparts a very small antistatic effect and the ionic organic agent alone imparts a better antistatic effect, when the two are used together in an antistatic layer, the effect is significantly greater than would be expected from the antistatic property of either material alone. This unexpected feature of the invention is described in more detail in the examples below. A further advantage of the antistatic combination of colloidal silica and ionic organic agent is that during the processing of a photographic element having an outer antistatic layer in aqueous processing solutions, the ionic organic agent dissolves leaving a hard layer of silica which retains any markings printed thereon. Thus, fortuitously, the silica layer not only prevents static but also permits marking the polymer layer, such as polyethylene, so the markings will be retained through processing. The antistatic coatings of the invention can be expected to be superior to similar coatings containing silica and a surfactant such as obtained by deposition on the polymer surface of colloidal silica and a quaternary ammonium, sulfonium or phosphonium salt which tend to be photoactive.

It is, accordingly, an object of the invention to provide a greatly improved antistatic photographic paper or element such as an element comprising a paper support coated on both sides with a layer of polymer and having one or more photographic layers, preferably light-sensitive silver halide emulsion layers, coated on one side thereof, and having at least one antistatic layer of the invention coated on the support. Another object of the invention is to provide a photographic paper or element of the above kind wherein the said antistatic layer is employed only as a backing layer. Another object is to provide an improved and novel antistatic composition. Another object is to provide a non-resin coated photographic element having an antistatic layer which is applied directly to the paper support. A still further object of the invention is to provide methods for preparing the above materials. Other objects will become apparent hereinafter.

In accordance with this invention, the improved light-sensitive, waterproof photographic papers or elements are prepared by applying a coating of either a cellulose ester such as cellulose acetate, or a linear polyester, or a polyolefin such as polypropylene or polyethylene, onto each side of the paper stock by solvent coating methods, by hot melt extrusion, or by lamination of a preformed sheet of the polymer thereto, as is well known in the art. Thus, different polymer layers may be present on the paper. Preferably, but not necessarily, the paper stock employed is one that has been tub sized with a mixture of gelatin and a conducting salt, e.g. an alkali metal sulfate such as sodium sulfate, which acts as an internal antistat and provides for improved antistatic properties of the final photographic product. In place of the aforesaid mixture, other known antistatic agents may be applied on or incorporated within the paper prior to application of the polymer so as to serve as internal antistats, as described in U.S. Pat. 3,253,922. If desired, the paper stock can be subjected to in-line electron bombardment prior to the application of any of the polymer coatings to improve adhesion. In place of electron bombardment, a primer or subcoating of a polyalkylene imine, such as polyethylene imine, can be used to improve adhesion of the polymer to the paper stock. In this case, the coverage of polyethylene imine is approximately 0.01 lb./1,000 sq. ft. on a dry weight basis. The thickness of the paper stock can vary widely from thin to semi-rigid sheets as desired. The thickness of the polymer layers, such as polyethylene layers, can also vary over a wide range, but is preferably from about 0.0001 to 0.05 inch, depending on the requirements of the final photographic product. Polyethylenes and polypropylenes capable of forming a continuous film can be used in the above procedure. As is well known, they will vary in melt viscosity and density according to the method of polymerization used, for example such as described in M. W. Perrin et al., U.S. Pat. No. 2,219,700, issued Oct. 29, 1940.

The cellulose organic acid esters used for coating the paper are those well known in the art including lower aliphatic acid esters of cellulose such as cellulose acetate, cellulose acetate propionate or cellulose acetate butyrate. Cellulose triacetate is especially useful. The linear polyesters used for coating the paper are also known and include polyethylene terephthalate and poly-(1,4-cyclohexanedimethylene terephthalate). If a polyester sheet is laminated to the paper, it may be an amorphous unoriented film or a film biaxially oriented as described in U.S. Pats. 2,823,521 and 2,779,684.

The antistatic coating composition is conveniently applied to one side of the polymer coated paper in the form of an aqueous dispersion and dried. Electron bombardment of the polyethylene coat prior to application of the antistat coating is optional. Where non-resin coated photographic paper is employed, the aqueous antistatic coating composition is applied directly to one surface of the paper.

In a very useful embodiment of the invention, the aqueous antistatic coating composition comprises (1) practically any silica sol, for example such as those described in R. F. Nickerson, U.S. Pat. No. 2,701,218, issued Feb. 1, 1955, but preferably a colloidal silica such as is sold under the trade name Ludox AM (an aluminum modified colloidal silica) by E. I. du Pont de Nemours and Co., and (2) an alkali metal salt of an alkylaryl polyether sulfonate, for example such as those described in W. D. Baldseifen, U.S. Pat. No. 2,600,831, issued June 17, 1952, but preferably a species of this salt sold under the trade name of Triton X200 (p-[1,1,3,3-tetramethylbutyl]phenoxyethoxyethyl sodium sulfonate) by E. I. du Pont de Nemours and Co. For best results, colloidal silicas are used having particles of large surface area of the order of 200–235 sq. meters per gram or approximate particle diameter of about 5–30 millimicrons. However, useful results are obtained with particle sizes less than about 250 millimicrons. Good antistatic coating compositions are also obtained by replacing part or all of the Ludox AM with Ludox HS (a trade name for a colloidal silica) also sold by the aforementioned Du Pont Co. Colloidal silicas sold under the trade name Syton by the Monsanto Chemical Co. are also useful. Polymeric dispersing agents, preferably of the synthetic type, may also be included, as desired, in the antistatic coating compositions of the invention.

Binding materials may also be included in the antistatic coating compositions such as, for example a cellulose ether sold under the trade name of Hydroxyethylcellulose WP4400 by Union Carbide Corporation, or, for example, a polystyrene latex such as Dow 586 or a styrene-butadiene copolymer latex such as Dow 512R (trade names for products sold by Dow Chemical Co.), or, for example, water-soluble vinyl polymers such as polyvinyl alcohol, and the like, in proportions of from about 5 to 10% based on the colloidal silica on a dry weight basis. In some cases, zinc oxide, alone or mixtures thereof with other metallic oxides of Groups II and III or Mendeleef's Periodic Table of the Elements, is advantageously incorporated in the antistatic layer in combination with substances forming insoluble and abrasion resistant coatings therewith, such as sodium silicate, silicon dioxide, sugar, eugenol, phosphoric acid, boric acid, tartaric acid and various other polybasic acids. Hydrochloric acid, citric acid or oxalic acid, may with advantage be included in the antistatic coating compositions in an amount of about from 10 to 50%, based on the dry weight of the colloidal silica, to improve adhesion and to form a satisfactory insoluble and abrasion resistant coating. Deliquescent salts such as calcium chloride, zinc chloride, zinc nitrate, potassium nitrate and the like, in amounts of from about 5 to 20%, or more, based on the colloidal silica on a dry weight basis, may be used in some formulations to increase the conductivity. A thickening agent such as Kelzan (trade name for a polysaccharide solid sold by Kelco Comapny), or a spreading agent such as the alkali metal salt of tridecoxyhexaethoxy sulfonic acid may also be included, as desired, in amounts ranging from about 0.001 to 2%, based on the dry weight of the colloidal silica and the added components. However, as previously indicated, the antistatic compositions essentially comprise colloidal silica and an ionic organic antistat compound, especially Ludox AM and Triton X200. The antistatic compositions as defined above are advantageously coated at coverages ranging, as desired, from about 0.1 to about 3 g./sq. meter on a dry weight basis. The ratio of colloidal silica to the ionic organic agent can vary widely, for example from about 2:1 to about 200:1. It is preferred to employ a ratio of about 2:1 to about 5:1 and particularly preferred to employ a ratio of about 3:1.

In another embodiment of the invention, part or all of the alkali metal salt of an alkylaryl polyether sulfonate in the aforementioned compositions may be replaced, for example with certain other arylsulfonic acid salts such as alkali metal salts of 2,5-naphthalene disulfonic acid, e.g. the sodium salt, alkali metal salts of lower alkyl substituted naphthalene sulfonic acids, e.g. the sodium salts of methyl, ethyl, butyl, etc., naphthalene sulfonic acids, or alkali metal salts of the condensation product of formaldehyde and 2,5-naphthalene disulfonic acid, e.g. the sodium salt and the like.

In yet another embodiment of the invention, there is substituted for the aforesaid organic ionic antistatic agents an alkali metal salt of a polymeric carboxylic acid. These salts function as both dispersing agents and antistatic agents and thus may be employed in small amounts in combination with an arylsulfonic acid salt for the former purpose or in larger amounts as a substitute for the arylsulfonic acid salt. Illustrative of such salts are the sodium polyacrylates, i.e., the sodium salts of polymerized acrylic acids such as acrylic acid, methacrylic acid, ethacrylic acid, and the like. Particularly good results are obtained by the use of Daxad 30 which is the trade name for a sodium salts of polymethacrylic acid sold by Dewey and Almy Chemical Co. Other commercially available products of this type which may be employed are Tamol 850 and Tamol 731 which are trade names for products sold by Rohm and Haas Co. Many other alklai metal salts of polymeric carboxylic acids may also be utilized as the ionic organic antistatic agent, for example potassium polyacrylates, alkali metal salts of acrylic acid copolymers such as the sodium salt of an acrylic acid-methyl acrylate copolymer, and the like. For use as an antistatic agent the alkali metal salt of a polymeric carboxylic acid is employed in similar proportions to those utilized with the arylsulfonic acid salts.

Photographic papers or other photographic elements combining good antistatic properties with good photographic characteristics can be prepared by employing a combination of colloidal silica with any one of the organic ionic antistatic agents described hereinabove, or any mixture thereof. Use of an alkali metal salt of an alkylaryl polyether sulfonate has been found to be particularly advantageous where the support employed is resin coated paper while use of an alkali metal salt of a polymeric carboxylic acid has been found to be particularly advantageous in those instances where the antistatic layer is applied directly to the surface of the paper.

The polymer coated elements of the invention provided with the antistatic layer can be adapted to use as a receiving sheet in the silver halide diffusion transfer process by coating with a layer of silver precipitating agent, such as colloidal silver, disclosed in James et al. U.S. Pat. 2,751,300. Similarly, by coating the antistatic sheet with a layer containing an onium compound or a development arrestor, such as an azole compound disclosed by Weyerts et al. U.S. Pat. 3,260,597, the sheet is adapted to use for receiving a color image diffusing from a sensitive element containing diffusible dye developers in the process of the Weyerts et al. patent. Static charges are not observed in handling the element.

The antistatic element also becomes useful in a lithographic printing plate after coating the surface opposite the antistatic layer with a pigmented hydrophilic organic colloid layer including, for example, polyvinyl alcohol and a pigment as disclosed in U.S. Pat. 3,055,295. A light-sensitive organic colloid layer is coated thereon for formation of a water-insoluble relief image. After inking, the plate prints from the areas of the relief images.

The polymer coated supports provided within the hereinbefore described antistatic layers are particularly useful for manufacture of light-sensitive elements for black-and-white or color photography. Representative elements for color photography comprise superposed red, green and blue light-sensitive silver halide emulsion layers containing, respectively, a cyanforming coupler (e.g. a phenolic compound), a magneta-forming coupler (e.g. a 5-pyrazolone compound) and a yellow-forming coupler (e.g. an open chain ketomethylene compound). Suitable non-diffusing couplers are disclosed in U.S. Pats. 2,407,293, 2,640,776 and 2,956,876. The couplers can be incorporated into the emulsion layers in accordance with well-known procedures, e.g. as described in U.S. Pat. 2,322,027 to Jelley et al.

It should be understood that while I describe, in one particular embodiment of the invention, the paper stock as being coated with layers of polymer such as polyethylene, this includes not just a single layer of polymer on each side of the paper, but also two or more layers of the same or different polymers on one side of the paper. For example, the paper may carry on the wire side a copolymer layer such as styrene-butadiene and thereover one or more layers of polyethylene. The antistatic layer is usually applied to the outer polymer surface of the coated paper and the photographic layers to the polymer surface on the other side of the paper.

For a more complete understanding of my invention, reference is made to the accompanying drawing illustrating antistat coated papers and photographic elements prepared therewith.

As shown in FIG. 1, a paper support 10 has coated thereon polyethylene layers 11 and 12, and an antistatic layer 13 directly over layer 12, the antistatic layer comprising a mixture of a colloidal silica and an organic antistatic agent such as, for example, an alkali metal salt of an alkylaryl polyether sulfonate.

Figure 2:
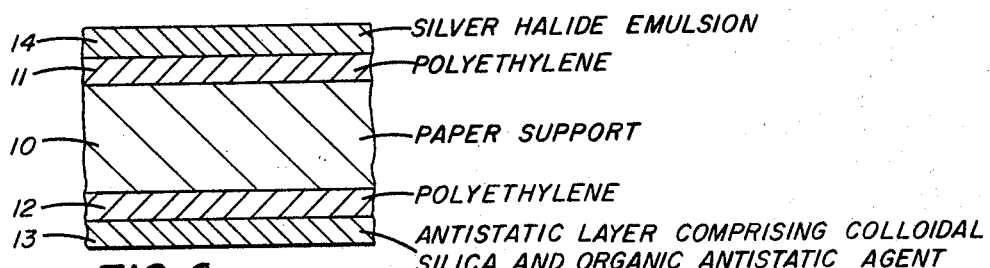

The coated paper shown in FIG. 2 is the same as that shown in FIG. 1, except that a gelatino-silver halide emulsion layer 14 is coated over polyethylene layer 11.

Figure 3:
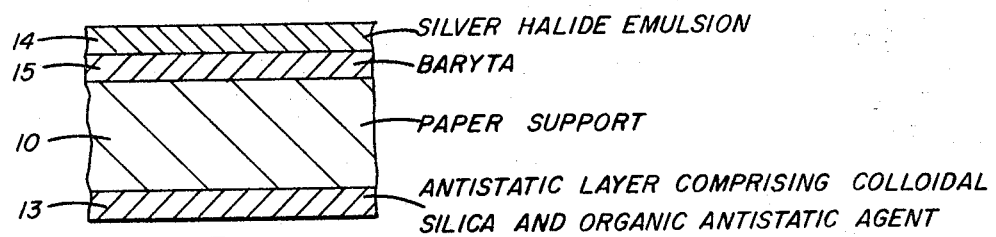

As shown in FIG. 3 paper support 10 has coated on one side thereof, in direct contact with the paper, antistatic layer 13 and on the opposing side gelatino-silver halide emulsion layer 14 coated over baryta layer 15.

Figure 4:
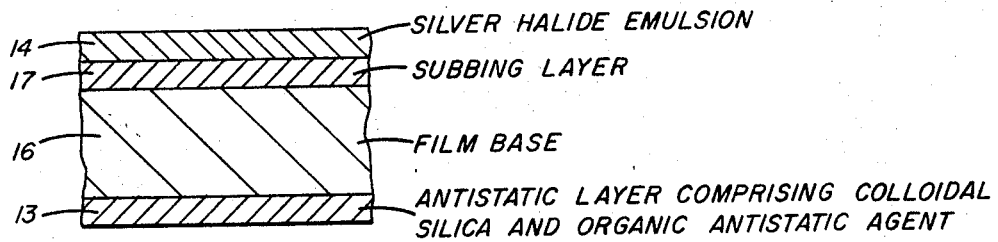

As shown in FIG. 4, photographic film base 16, composed, for example, of cellulose triacetate, has coated on one side thereof antistatic layer 13 and on the opposite side gelatino-silver halide emulsion layer 14 coated over gelatin-cellulose nitrate subbing layer 17.

The following examples further illustrate the invention.

EXAMPLE 1

A paper stock which had previously been tub sized with a mixture of gelatin and sodium sulfate (coverage approximately 0.5 lb./1,000 sq. ft.) and extrusion coated on both sides with polyethylene at a thickness of approximately 0.0015 inch, was overcoated on the wire side at a coverage of 0.13 g./sq. meter (on a dry weight basis) with an antistatic coating composition of the following formulation:

| Formula | Dry | Wet |
|---|---|---|
| Water | | 1.67 lbs. |
| 10% Tamol 850 | 3 gms | 30 cc. |
| Zinc Oxide | 1.67 lbs | 1.67 lbs. |
| Ludox AM | 3.67 lbs | 12.24 lbs. |
| 10% STT-6A[1] | 48 gms | 480 cc. |
| Kelzan | 123 gms | 59 lbs. |
| Water | | 138.6 lbs. |
| (2,5-naphthalene disulfonic acid sodium salt 59.3% solids 2.02 lbs. dissolved in 50 lbs. H$_2$O) | 1.2 lbs | 52.02 lbs. |
| Butyl alcohol | | 5.4 lbs. |
| | 6.812 lbs | 272.00 lbs. |

[1] Tridecoxyhexaethoxy sulfonic acid, sodium salt; Solids, 2.5%. Viscosity, 1 cps., pH 7.9.

The antistatic layer was dried and the surface resistivity of the resulting antistatic paper was measured by the previously described procedure for such determinations. It had a surface resistivity of $4.8 \times 10^{11}$ ohms as compared with $1 \times 10^{15}$ ohms prior to application of the antistat overcoating.

The polyethylene coating on the reverse side to the antistatic layer was then subjected to electron bombardment, followed by coating a suitable gelatino-silver halide emulsion layer thereover. A second sample of the polyethylene coated paper stock was coated in the same way with a gelatino-silver halide emulsion layer except that no antistatic backing layer was applied thereto. After curing, these samples were treated with a photographic developing solution. It was found that the antistat coated sample was entirely free from any static discharge defects, whereas the sample without the antistat coat showed undesirable fog patterns.

EXAMPLE 2

The procedure of Example 1 was followed except that the following antistatic coating composition was substituted at a coverage of approximately 0.5 to 0.75 g./sq. meter (on a dry weight basis).

| | Formula 1 | | Formula 2 | |
|---|---|---|---|---|
| | Dry | Wet | Dry | Wet |
| Water | | 20 | | 20 |
| 10% Tamol 850 | 0.078 | 0.78 | 0.078 | 0.78 |
| Zinc Oxide XX503 | 20 | 20 | 20 | 20 |
| 30% Ludox AM | 44 | 147 | 44 | 147 |
| 10% Triton X200 | 0.5 | 5 | 0.05 | 5 |
| Kelzan | 1 | 200 | 1 | 200 |
| Calcium Chloride | 8 | 107 | 8 | 107 |
| Citric Acid | | | 0.7 | 70 |
| Butyl Alcohol | | 33 | | 33 |
| Water | | 190 | | 171 |
| | 73.578 | 722.78 | 74.278 | 773.78 |

All weights in pounds.

Abrasion resistance was tested by rubbing the surface of the antistat coating with black paper and observing how much white coating was abraded off. Pressure and the number of strokes were constant. The results indicated that the citric acid added to Formula 2 improved the abrasion resistance considerably. The application of heat improved the heat resistance of both formulas. The surface resistivities of the antistat coated papers of above Formulas 1 and 2 were found to be approximately $8.5 \times 10^{11}$ ohms, as compared to $1 \times 10^{15}$ ohms for the uncoated comparison. Photographic tests indicated that no static was formed with the antistat coated papers whereas the uncoated comparison produced fogged emulsions.

EXAMPLE 3

A paper stock is extrusion coated on one side with polypropylene (7.5 lbs./1,000 sq. ft.) and on the other side with polyethylene terephthalate (6.0 lbs./1,000 sq. ft.). The antistatic composition of Formula 1 of Example 2 is applied to the surface of the polyester layer. After electron bombardment of the polypropylene surface, three differently sensitized coupler-containing silver halide emulsions, such as described in the Jelley et al. U.S. Pat. 2,322,027, are coated on the bombarded surface. After exposure and development of the product in a color developer solution such as described by the above Jelley et al. patent, cyan, magenta and yellow dyes are formed in the emulsion layers and there is no evidence of emulsion fogging due to static discharges. A similar sensitized product not having the antistatic layer affixed to the polyester surface, after exposure processing exhibits fog patterns due to static arising from handling of the product during and after coating the emulsions on the support.

EXAMPLE 4

The procedure of Example 1 was followed except that the following antistatic coating was substituted at a coverage of approximately 0.5 g./sq. meter (on a dry weight basis).

| | Formula | |
|---|---|---|
| | Dry | Wet |
| Ludox AM | 16 | 53.4 |
| 10% Triton X200 | 0.5 | 5 |
| Tamol 850 | 16 | 160 |
| 3.5% Hydrochloric acid | | 25 |
| Water | | 85.5 |
| | 32.5 | 328.9 |

All weights in pounds.

Abrasion resistance of the above prepared paper was superior to Formula 2 of Example 2. Practically no material was abraded off in the abrasion test. Resistivity was $1 \times 10^{11}$ ohms. Photographic tests indicated that no static was formed with the antistat coated paper, whereas the uncoated comparison resulted in an irregularly fogged emulsion.

EXAMPLE 5

This example represents a modification of Example 4 and provides rheological properties needed for gravure application.

The procedure of Example 1 was followed except that the following antistatic coating composition was substituted at a coverage of approximately 0.5 g./sq. meter (on a dry weight basis), and gravure coated onto the polyethylene coated paper stock.

FORMULA

|  | | Wet |
|---|---|---|
| 30% Ludox AM | g | 422 |
| 22% Triton X200 | cc | 17.5 |
| 2.75% hydroxyethylcellulose WP4400 | g | 261.8 |
| 30% Tamol 850 | g | 422 |
| Butyl alcohol | cc | 17.5 |
| Water | cc | 546 |

The surface resistivity of the antistat coated paper was equivalent to that of Example 4. The viscosity may be varied or there may be substituted other grades of hydroxyethylcellulose as required for minimizing gravure pattern.

EXAMPLE 6

This example illustrates the preparation of an anti-stat coated paper which is especially suitable for the preparation of both color and black and white photographic image products. Simple, non-critical make-up and gravure coatability are its main advantages. Results indicate that it fully satisfies the photographic and physical requirements of effective antistatic coatings.

The procedure of Example 1 was followed except that the following antistatic coating composition was substituted at a coverage of approximiately 0.9 g./sq. meter (on a dry weight basis) and suitable color sensitive and black and white gelatino-silver halide emulsions were used.

|  | Formula | | |
|---|---|---|---|
|  | 1 | 2 | 3 |
| 30% Ludox AM | 10.56 kg | 528 g | 528 g. |
| 22% Triton X200 | 950 cc | 47.5 cc | 47.5 cc. |
| 2.5% hydroxyethyl cellulose WP 4400 | 3.8 kg | 190 g | 190 g. |
| Butyl alcohol | 438 cc |  | 150 cc. |
| Tributyl phosphate |  | 18 cc |  |
| Water | 13.25 kg | 653 g | 525 g. |

Formulas 2 and 3 were designed to combat excessive foam during coating, and appear to be especially useful for commercial manufacture. All of the above compositions produced antistat papers having surface resistivities less than $10^{12}$ ohms and the photographic tests indicated no static was formed, whereas the uncoated comparison showed a surface resistivity of about $1 \times 10^{15}$ ohms and produced fogged emulsions.

EXAMPLE 7

The procedure of Example 1 is carried out except that the emulsion layer is replaced by a hydrophilic colloid layer containing a silver precipitating agent such as colloidal silver in gelatin. The resulting paper carrying the colloidal silica-aryl sulfonate antistatic layer, is adapted to use as a reception element in the well-known silver halide diffusion transfer process. Static charges do not accumulate on this paper during coating, slitting and spooling operations used to prepare the paper for use in the diffusion transfer process.

EXAMPLE 8

The procedure of Example 1 is carried out except that the bombarded polymer layer is coated with a gelatin layer containing a mercaptoazole to adapt the sheet to use as a color diffusion transfer sheet in the process of U.S. Pat. 3,260,597 as described above.

EXAMPLE 9

The procedure of Example 1 is carried out except that the paper stock is coated on the face side with cellulose tri-acetate and polyethylene on the wire side. After application of the antistatic coating to the polyethylene surface, the cellulose acetate surface is subbed with a gelatin-cellulose nitrate composition and sensitized with a gelatin silver halide emulsion layer. The surface resistivity of the element is sufficiently low that fog patterns do not appear in the emulsion layer.

EXAMPLE 10

The mentioned unexpected antistatic properties of the colloidal silica-aryl sulfonate layers is demonstrated by coating onto the polyethylene coated paper stock of Example 1, the antistatic compositions shown in the next table differing only in whether they contained only Ludox AM or Triton X200 or a mixture of both.

TABLE I

| Sample No. | Coverage, gms./m.[1] | Dry Thickness (mills) | Surface Resistivity (ohms) | | |
|---|---|---|---|---|---|
|  |  |  | Conditioned 16 Hrs. 20% RH 75° F. | Conditioned 48 Hrs. 20% RH 75° F. | |
| 1 | 2.1 Ludox AM | 0.0375 | $1 \times 15^{15}$ | $>10^{16}$ | |
| 2 | 1.16 Triton X200 | 0.0375 | $1 \times 10^{15}$ | $>10^{16}$ | |
| 3 | 1.87 Ludox AM+0.128 Triton X200. | 0.0375 | $9 \times 10^{12}$ | $5 \times 10^{12}$ | |
| 4 | 1.05 Ludox AM | 0.0188 | $1 + 10^{14}$ | $>10^{16}$ | |
| 5 | 0.58 Triton X200 | 0.0188 | $2 \times 10^{14}$ | $>10^{16}$ | |
| 6 | 0.936 Ludox AM+0.064 Triton X200. | 0.0188 | $2 \times 10^{13}$ | $2 \times 10^{13}$ | |

[1] Coverages were calculated to give the same dry thicknesses.

The data in Table I clearly show that the antistatic compositions of the invention, represented by samples 3 and 6, had much lower surface resistivity and, therefore, afforded much better static protection than would be expected from the antistatic activity of either the Ludox or Triton materials alone. In Table I the term "Greater han $10^{16}$" means the resistivity of samples 1, 2, 4 and 5 was so high they were beyond the capabilities of the apparatus to measure the values.

The invention broadly includes the use of the antistatic layer on any layer or sheet of polymeric material for the prevention of static. Thus, polymeric sheeting such as photographic film base of, for example, cellulose ester, polyester or poly-α-olefin is coated with the antistatic layer ordinarily prior to coating the photographic emulsion layer on the base as illustrated in the following example.

EXAMPLE 11

Cellulose triacetate film base is coated with the composition of Example 6, Formula 1, at a coverage of about 0.5 g./sq. meter. The layer produces no photographically significant reduction in transparency of the film base. A gelatin-cellulose nitrate subbing layer is coated on the surface opposite the antistatic layer and a high speed gelatin silver halide emulsion is coated thereon. Static charges are not generated in handling the film.

EXAMPLE 12

To demonstrate the effectiveness of the antistatic coating compositions of this invention when applied directly to paper, resistivity measurements were made on samples of paper coated with a mixture of Ludox AM and Daxad 30. The paper employed was a softwood bleached sulfite sheet containing both internal and surface sizing agents. Two different antistatic coating compositions, designated as compositions A and B, were prepared as follows:

| Component | Volume (cc.) | |
|---|---|---|
| | Composition A | Composition B |
| Ludox AM | 350 | 388 |
| Daxad 30 | 140 | 94 |
| Water | 470 | 579 |
| Butanol | 40 | 40 |

The results obtained with these coating compositions are reported in Table II below which also includes, for purposes of comparison, the results obtained where Ludox AM and Daxad 30 were used alone rather than in combination.

TABLE II

| Test No. | Coating Weight (g./m.²) | Logarithm of Surface Resistivity in Ohms (20% R.H., 70° F. and 500 Volt Test Potential) | | | |
|---|---|---|---|---|---|
| | | Ludox AM | Daxad 30 | Composition A | Composition B |
| 1 | 0.38 | 12.4 | 11.7 | | 11.5 |
| 2 | 0.43 | 12.3 | 11.6 | 10.0 | |
| 3 | 0.78 | 11.9 | 10.5 | | 10.0 |
| 4 | 0.88 | 11.8 | 10.6 | 9.2 | |
| 5 | 1.74 | 11.0 | 9.7 | | 9.3 |
| 6 | 1.98 | 10.8 | 9.5 | 8.5 | |

As evidenced by the data reported in Table II, when the total coverage is kept constant to permit comparison, in each instance the resistivity is lower for the mixture of Ludox AM and Daxad 30 than for either of these ingredients used by itself. It is, accordingly, apparent that there is a synergistic action between the Ludox AM and the Daxad 30 which provides a highly effective antistatic layer. As compared with the values for surface resistivity reported in the table, the same paper without the antistatic layer has a surface resistivity value in log ohms of 13.

EXAMPLE 13

A softwood bleached sulfite sheet containing both internal and surface sizing agents was coated directly with an antistatic layer in accordance with this invention and the surface resistivity was determined. The coating composition contained Ludox AM, Daxad 30, water and butanol (40 cc. of butanol per liter of total solution) with the proportions and application rate being such as to provide a dry coverage of 4 g./m.² at a three to one ratio of Ludox AM to Daxad 30. The logarithm of the surface resistivity in ohms, as measured at 73° F. and 20% R.H., was 8.7 as compared wtih a value for the same paper without the antistatic layer of 14.

It will be understood that any gelatino-silver halide emulsions that are customarily employed in the art for the preparation of color or black and white light-sensitive photographic papers can be employed in the production of the antistatic photographic papers or elements of the invention.

Other species of the antistatic coating compositions and antistat photographic papers or elements coming within the invention can be prepared in accordance with the preceding choice of the mentioned components in the specified ranges of proportions.

As indicated previously, the antistatic coatings of the invention show high resistance to abrasion and also will retain backmarkings when the paper is photographically processed. This is a decided advantage because it permits use of a print chopping system employed by commercial photofinishers, wherein an electrical-mechanical device is actuated by graphite conductive marks. These marks are applied to the back of the strand of prints during exposure and before processing and they must be retained to activate the chopper equipment after processing. In this connection, it should be noted that most of the known antistatic compositions are soluble, will dissolve in the processing chemicals, and the graphite backmarkings will come off. The soluble materials also have undesirable effects on the color process such as changing speed or contrast and producing fog, sludges and foam. The present invention is substantially free from such disadvantages.

Although the invention has been described in considerable detail with particular reference to certain preferred embodiments thereof, it will be understood that variations and modifications can be effected within the spirit and scope of the invention as described hereinabove, and as defined in the appended claims.

I claim:

1. A photographic element which comprises a support, an antistatic layer on one side of said support comprising colloidal silica and at least one organic antistatic agent selected from the group consisting of an alkali metal salt of an alkylaryl polyether sulfonate and an alkali metal salt of a polymeric carboxylic acid, and at least one photosensitive photographic layer on the side of said support opposite to said antistatic layer.

2. A photographic element as described in claim 1 wherein the support is paper.

3. A photographic element as described in claim 1 wherein the support is photographic film base.

4. A photographic element as described in claim 1 wherein the support is paper coated with at least one layer of a polymer selected from the group consisting of poly-α-olefins, cellulose organic acid esters, and linear polyesters.

5. A photographic element as described in claim 1 wherein the support is paper coated with at least one layer of polyethylene.

6. A photographic element as described in claim 1 wherein said antistatic layer additionally comprises zinc oxide.

7. A photographic element as described in claim 1 wherein said antistatic layer additionally comprises hydroxyethyl cellulose.

8. A photographic element as described in claim 1 having at least one silver halide emulsion layer on the side of said support opposite to said antistatic layer.

9. A photographic element as described in claim 1 wherein said organic antistatic agent is an alkali metal salt of an alkylaryl polyether sulfonate.

10. A photographic element as described in claim 1 wherein said organic antistatic agent is p-(1,1,3,3-tetramethylbutyl)phenoxyethoxyethyl sodium sulfonate.

11. A photographic element as described in claim 1 wherein said organic antistatic agent is a sodium polyacrylate.

12. A photographic element as described in claim 1 wherein said organic antistatic agent is the sodium salt of polymethacrylic acid.

13. A photographic element which comprises a paper support; an antistatic layer adhered directly to one side of said paper support, said antistatic layer comprising colloidal silica and at least one organic antistatic agent selected from the group consisting of an alkali metal salt of an alkylaryl polyether sulfonate and an alkali metal salt of a polymeric carboxylic acid; and at least one silver halide emulsion layer on the side of said support opposite to said antistatic layer.

14. A photographic element as described in claim 13 wherein said organic antistatic agent is a sodium polyacrylate.

15. A photographic element which comprises a paper support, said paper support being coated on each side with a layer of a polymer selected from the group consisting of poly-α-olefins, cellulose organic acid esters, and linear polyesters; an antistatic layer adhered to said polymer layer on one side of said support, said antistatic layer comprising colloidal silica and at least one organic antistatic agent selected from the group consisting of an alkali metal salt of an alkylaryl polyether sulfonate and an alkali metal salt of a polymeric carboxylic acid; and at least one silver halide emulsion layer on the side of said support opposite to said antistatic layer.

16. A photographic element as described in claim 15 wherein said polymer is polyethylene and said organic antistatic agent is p-(1,1,3,3-tetramethylbutyl)phenoxyethoxyethyl sodium sulfonate.

17. A photographic element as described in claim 15 including an antistatic agent incorporated within said paper.

18. A photographic element as described in claim 15 having an antistatic coating on said paper beneath at least one of said polymer layers.

19. A photographic element as described in claim 15 wherein said paper has been tub sized with a mixture of gelatin and sodium sulfate prior to application of said polymer thereto.

20. A photographic element as described in claim 15 having a plurality of differently sensitized coupler-containing silver halide emulsion layers.

21. A photographic element as described in claim 16 having a plurality of differently sensitized coupler-containing silver halide emulsion layers.

References Cited

UNITED STATES PATENTS

| | | |
|---|---|---|
| 2,074,647 | 3/1937 | Hagedorn et al. |
| 3,053,662 | 9/1962 | Mackey et al. |
| 3,222,178 | 12/1965 | Nadeau et al. |
| 2,649,374 | 8/1953 | Richardson. |
| 2,322,037 | 6/1943 | Lindquist. |

FOREIGN PATENTS

| | | |
|---|---|---|
| 894,572 | 4/1962 | Great Britain. |
| 1,016,282 | 1/1966 | Great Britain. |
| 1,460,174 | 10/1966 | France. |

RONALD H. SMITH, Primary Examiner

U.S. Cl. X.R.

96—87